US011438316B2

(12) United States Patent
Puzeris et al.

(10) Patent No.: US 11,438,316 B2
(45) Date of Patent: Sep. 6, 2022

(54) SHARING ENCRYPTED ITEMS WITH PARTICIPANTS VERIFICATION (71) Applicant: 360 IT, UAB, Vilnius (LT)

(72) Inventors: Eimantas Puzeris, Kaunas (LT); Mindaugas Valkaitis, Vilnius (LT)

(73) Assignee: 360 IT, UAB, Vilnius (LT)

( * ) Notice: Subject to any disclaimer, the term of this patent is extended or adjusted under 35 U.S.C. 154(b) by 28 days.

(21) Appl. No.: 16/745,334

(22) Filed: Jan. 16, 2020

(65) Prior Publication Data
US 2021/0226933 A1    Jul. 22, 2021

(51) Int. Cl.
*H04L 9/40* (2022.01)
(52) U.S. Cl.
CPC ...... *H04L 63/0442* (2013.01); *H04L 63/0435* (2013.01); *H04L 63/0485* (2013.01); *H04L 63/18* (2013.01)
(58) Field of Classification Search
CPC ............. H04L 63/0442; H04L 63/0435; H04L 63/0485; H04L 63/18
See application file for complete search history.

(56) References Cited

U.S. PATENT DOCUMENTS

| 7,418,596 | B1 | 8/2008 | Carroll et al. |
| 9,077,538 | B1 | 7/2015 | Cooley et al. |
| 9,143,504 | B1 | 9/2015 | Shi et al. |
| 10,171,461 | B2 | 1/2019 | Pizano |
| 2007/0055877 | A1* | 3/2007 | Persson ............... H04L 63/0442 713/171 |
| 2009/0327724 | A1 | 12/2009 | Shah et al. |
| 2013/0311382 | A1* | 11/2013 | Fosmark .............. G06Q 20/425 705/71 |
| 2015/0288760 | A1* | 10/2015 | Thomas ................. H04L 67/10 709/203 |
| 2016/0315923 | A1* | 10/2016 | Riscombe-Burton ...................... H04L 63/0281 |

(Continued)

OTHER PUBLICATIONS

Dashlane, "Dashlane Security White Paper", Oct. 2018.
(Continued)

*Primary Examiner* — Alexander Lagor
*Assistant Examiner* — Forrest L Carey
(74) *Attorney, Agent, or Firm* — Young Basile Hanlon & MacFarlane, P.C.

(57) ABSTRACT

A method and apparatus for establishing a trust relationship between users is disclosed. The apparatus includes at least two user devices containing the Application, a service provider server (SPS) comprising an application programming interface (API), a network communicably coupling the sender device, the receiver device and the SPS, and an out-of-band (OOB) channel, separate from the network, communicably coupling the sender device and the receiver device. The method includes obtaining a receiver's Public Key provided by an Application Programming Interface (API) on an service provider server, encrypting a verification message with the Receiver's Public key and the Sender's Private Key, sending the encrypted verification message from the Sender's device to the Receiver's device through the out-of-band channel, decrypting the encrypted verification message using Receiver's Private Key and Sender's Public Key, and communicating decrypted verification message via out-of-band channel.

18 Claims, 8 Drawing Sheets

(56) References Cited

U.S. PATENT DOCUMENTS

2018/0322298 A1 11/2018 Momchilov et al.
2020/0052905 A1* 2/2020 Mathias ............... H04L 9/006

OTHER PUBLICATIONS

"Chapter 13: Key Management Techniques ED—Menezes A J; Van Oorschot PC; Vanstone S A", Handbook of Applied Cryptography; [CRC Press Series On Discreie Mathematices and Its Applications], CRC Press, Boca Raton, FL, US, pp. 543-590, 1996, XP001525013, ISBN: 978-0-8493-8523-0 Retrieved from the Internet: URL:http://www.cacr.math.uwaterloo.ca/hac/[retrieved on Feb. 10, 2021] p. 549-p. 550 p. 555-p. 556.
International Search Report, International application No. PCT/IB2021/050159, dated Feb. 19, 2021.

* cited by examiner

SHARING ENCRYPTED ITEMS WITH PARTICIPANTS VERIFICATION

FIELD OF THE DISCLOSURE

Aspects of the disclosure relate to computer hardware and software in protecting access to data via a platform, e.g. using keys or access control rules. The present embodiments relate to the network architectures or network communication protocols for network security for supporting key management in a packet data network for key exchange, more specifically, exchanging the respective security keys directly between two communicating parties. In particular, one or more aspects of the disclosure generally relate to storing, using and exchanging/sharing encrypted data (such as passwords or other digital items) in a secure fashion.

BACKGROUND

Applications with password or item sharing feature that encrypt the items to be protected, and rely on the service provider backend infrastructure to store the encrypted items currently allow the service provider to bypass the encryption of item, improperly gain access to said items without alerting the owner of the data. This is because the public keys of the sharing participants do not benefit from mutual authentication. This would allow the service provider to obtain access to all shared items without the sender or the recipient being able to detect that something went wrong: when a user initiates sharing of an encrypted item the service provider would simply advertise a fake public key for the item recipient, causing the sender to share the item to the service provider i.e. the wrong recipient. The service provider can then re-share the obtained item to the correct recipient intended originally, thereby avoiding any suspicion from either Sender or Receiver.

The proposed solution provides a safe way for the user to share the encrypted passwords or other digital items without any fear that such information can be obtained by the service provider or any other third party (hacker attack or rogue employee).

The following sections will elaborate and clarify the technology notions the solution employs, is dependent upon or is related to, such as encryption in general, authentication methodologies and attack vectors mitigation.

In cryptography, encryption is the process of encoding a message or information in such a way that only authorized parties can access it and those who are not authorized cannot. Encryption does not itself prevent interference but denies the intelligible content to a would-be interceptor. In an encryption scheme, the intended information or message, referred to as plaintext, is encrypted using an encryption algorithm—a cipher—generating ciphertext that can be read only if decrypted. For technical reasons, an encryption scheme usually uses a pseudo-random encryption key generated by an algorithm. It is in principle possible to decrypt the message without possessing the key, but, for a well-designed encryption scheme, considerable computational resources and skills are required. An authorized recipient can easily decrypt the message with the key provided by the originator to recipients but not to unauthorized users.

Symmetric and asymmetric cryptographic systems are two major approaches to encryption technique. Symmetric-key cryptography refers to a cryptographic system that employs the same key for both data encryption and decryption. This means that all participants of the data exchange must know the same key to be able to securely send the encrypted message and to decrypt the encrypted messages received.

Therefore, the key shared among parties, but having to stay secret to 3rd parties—in order to keep communications private—is considered a shared secret. No adversary can decrypt the message without knowing the secret key without dedicating significant resources for breaking the encryption without knowing the right keys. The quality of the encryption scheme is judged by how prohibitive the cost of such breaking is.

Public-key cryptography, or asymmetric cryptography, refers to a cryptographic system that uses pairs of keys: public keys which are to be accessible freely, and private keys which are only accessible to the owner. The generation of such keys depends on cryptographic algorithms based on mathematical problems to produce one-way functions. Effective security only requires keeping the private key private; the public key can be openly distributed without compromising security.

In such a system, any person can encrypt a message using the receiver's public key, but that encrypted message can only be decrypted with the receiver's private key.

Robust authentication is also possible. A sender can combine a message with a private key to create a short digital signature on the message. Anyone with the sender's corresponding public key can combine the same message and the supposed digital signature associated with it to verify whether the signature was valid, i.e. made by the owner of the corresponding private key.

Two of the best-known uses of public key cryptography are: 1) Public key encryption, in which a message is encrypted with a recipient's public key. The message cannot be decrypted by anyone who does not possess the matching private key, who is thus presumed to be the owner of that key and the person associated with the public key. This is used in an attempt to ensure confidentiality. 2) Digital signatures, in which a message is signed with the sender's private key and can be verified by anyone who has access to the sender's public key. This verification proves that the sender had access to the private key, and therefore is likely to be the person associated with the public key. This also ensures that the message has not been tampered with, as a signature is mathematically bound to the message it originally was made with, and verification will fail for practically any other message, no matter how similar to the original message.

Public key algorithms are fundamental security ingredients in modern cryptosystems, applications and protocols assuring the confidentiality, authenticity and non-repudiability of electronic communications and data storage. They underpin various Internet standards, such as Transport Layer Security (TLS), S/MIME, PGP, and GPG. Some public key algorithms provide key distribution and secrecy (e.g., Diffie-Hellman key exchange), some provide digital signatures (e.g., Digital Signature Algorithm), and some provide both (e.g., RSA).

Authenticated encryption (AE) and authenticated encryption with associated data (AEAD) are forms of encryption which simultaneously assure the confidentiality and authenticity of data. These attributes are provided under a single, easy to use programming interface.

An important part of cryptography is the notion of key derivation, where a key derivation function (KDF) derives one or more secret keys from a secret value such as a master key, a password, or a passphrase using a pseudorandom function. KDFs can be used to stretch keys into longer keys or to obtain keys of a required format, such as converting a group element that is the result of a Diffie-Hellman key exchange into a symmetric key for use with AES. Keyed cryptographic hash functions are popular examples of pseudorandom functions used for key derivation.

An important cryptography concept that is relevant within the issue of key derivation is salt, i.e. random data that is used as an additional input to a one-way function that "hashes" the input data, a password or passphrase. Salts are used to safeguard passwords in storage. Historically a password was stored in plaintext on a system, but over time additional safeguards developed to protect a user's password against being read from the system. A salt is one of those methods.

A new salt is randomly generated for each password. In a typical setting, the salt and the password (or its version after Key stretching) are concatenated and processed with a cryptographic hash function, and the resulting output (but not the original password) is stored with the salt in a database. Hashing allows for later authentication without keeping, and therefore risking, the plaintext password if the authentication data store is compromised.

Salts defend against a pre-computed hash attack. Since salts do not have to be memorized by humans, they can make the size of the hash table required for a successful attack prohibitively large without placing a burden on the users. Since salts are different in each case, they also protect commonly used passwords, or those users who use the same password on several sites, by making all salted hash instances for the same password different from each other.

Cryptographic salts are broadly used in many modern computer systems, from Unix system credentials to Internet security.

Salts are closely related to the concept of a cryptographic nonce, which is an arbitrary number that can be used just once in a cryptographic communication. It is similar in spirit to a nonce word, hence the name. It is often a random or pseudo-random number issued in an authentication protocol to ensure that old communications cannot be reused in a replay attack. They can also be useful as initialization vectors and in cryptographic hash functions, both important concepts to elaborate upon.

A cryptographic hash function (CHF) is a hash function that is suitable for use in cryptography. It is a mathematical algorithm that maps data of arbitrary size (often called the "message") to a bit string of a fixed size (the "hash value", "hash", or "message digest") and is a one-way function, that is, a function which is practically infeasible to invert. Ideally, the only way to find a message that produces a given hash is to attempt a brute-force search of possible inputs to see if they produce a match or use a rainbow table of matched hashes. Cryptographic hash functions are a basic tool of modern cryptography.

In cryptography, key stretching techniques are used to make a possibly weak key, typically a password or passphrase, more secure against a brute-force attack by increasing the resources (time and possibly space) it takes to test each possible key. Passwords or passphrases created by humans are often short or predictable enough to allow password cracking, and key stretching is intended to make such attacks more difficult by complicating a basic step of trying a single password candidate. Because a key generation function must be deterministic so that the weak key always generates the same stretched key (called an enhanced key), the stretching of the key does not alter the entropy of the key-space, only complicates the method of computing the enhanced key. Attacks on unsalted key stretching functions exist called rainbow tables. Salting the key is the process of appending a long, random string to the weak key. This is done so that precomputed hashes of either short keys or password lists cannot be used in authentication schemes that require the hash to be presented or to reverse hashes into their original pass-phrases which may be used to compromise users on other services using the same pass-phrase.

Another relevant part of the context the current embodiment works within is the concept of Multi-factor authentication (MFA). MFA is an authentication method in which a computer user is granted access only after successfully presenting two or more pieces of evidence (or factors) to an authentication mechanism: knowledge (something the user and only the user knows), possession (something the user and only the user has), and inherence (something the user and only the user is).

Two-factor authentication (also known as 2FA) is a type, or subset, of multi-factor authentication. It is a method of confirming users' claimed identities by using a combination of two different factors: 1) something they know, 2) something they have, or 3) something they are.

Several attack vectors are especially relevant within the context of exchanging data in a secure and protected fashion between users that are not part of the same mutually verified trusted platform.

A replay attack (also known as playback attack) is a form of network attack in which a valid data transmission is maliciously or fraudulently repeated or delayed. This is carried out either by the originator or by an adversary who intercepts the data and re-transmits it, possibly as part of a masquerade attack by IP packet substitution. This is one of the lower tier versions of a "Man-in-the-middle attack" (MITM).

In cryptography and computer security, a man-in-the-middle attack is an attack where the attacker secretly relays and possibly alters the communications between two parties who believe that they are directly communicating with each other. One example of a MITM attack is active eavesdropping, in which the attacker makes independent connections with the victims and relays messages between them to make them believe they are talking directly to each other over a private connection, when in fact the entire conversation is controlled by the attacker. The attacker must be able to intercept all relevant messages passing between the two victims and inject new ones. This is straightforward in many circumstances; for example, an attacker within the reception range of an unencrypted wireless access point could insert themselves as a man-in-the-middle.

As it aims to circumvent mutual authentication, a MITM attack can succeed only when the attacker impersonates each endpoint sufficiently well to satisfy their expectations. Most cryptographic protocols include some form of endpoint authentication specifically to prevent MITM attacks.

SUMMARY

Embodiments of the present invention provide an improved system of encrypted Item 210 that overcomes the problems and limitations of the prior art. Particularly, embodiments of the present invention provide a system and method of encrypting a digital Item 210 and associating the said Item 210 with a recipient or group of recipients, wherein only an authorized recipient is provided a key for decrypting the message or optionally the authorized recipient's identity must also be verified in a reliable fashion.

According to an embodiment, a reliable and secure method for sharing encrypted Items 210 comprises authenticating the Sender against API database and obtaining an authentication token from API for the duration of a session. "Authenticating against" means authenticate user by comparing the credentials user provides with the customer database record Service provider holds. The method may be performed, for example, by a computer executable program (or an application), at least a part of which is stored on a computer-readable medium.

When the user is authenticated within the Application 202, the user may be prompted to provide entropy data necessary for derivation of the encryption keys e.g. in the format of a Master password. In computing, entropy is the randomness collected by an operating system or application for use in cryptography or other uses that require random data. This randomness is often collected from hardware sources (variance in fan noise or HDD), either pre-existing ones such as mouse movements or specially provided randomness generators. The Application 202 may use the entropy user provided, e.g. the Master password, together with some additional entropy, 'salt' added further thereon, to derive a symmetric Master key 204 for encrypting Sender's Private key, of the Sender's asymmetric key pair. The 'salt' is necessary to compensate for the possibility of Master password being too short or not complex enough for producing a reliably secure key.

Each protected Item 210 is assigned by the Application 202 a unique item identification and is encrypted with an individual symmetric item encryption key, Item Key 208 further on. Item Key 208 is a symmetric key used to encrypt the very item user wants protected. These symmetric keys are generated by the Application 202 on a one-to-one basis for encrypting and decrypting a particular item, such as a set of user credentials. Item Key 208 is correspondingly encrypted with the user's Public Key, of the user's asymmetric key pair, generated by the Application 202 when registering the user. The Private Key, of the user's asymmetric key pair, generated by the Application 202 when registering the user, is used for decrypting the Item Keys, and is correspondingly encrypted with a symmetric Master key 204, derived from the Master password and Salt 212.

Figure 3:
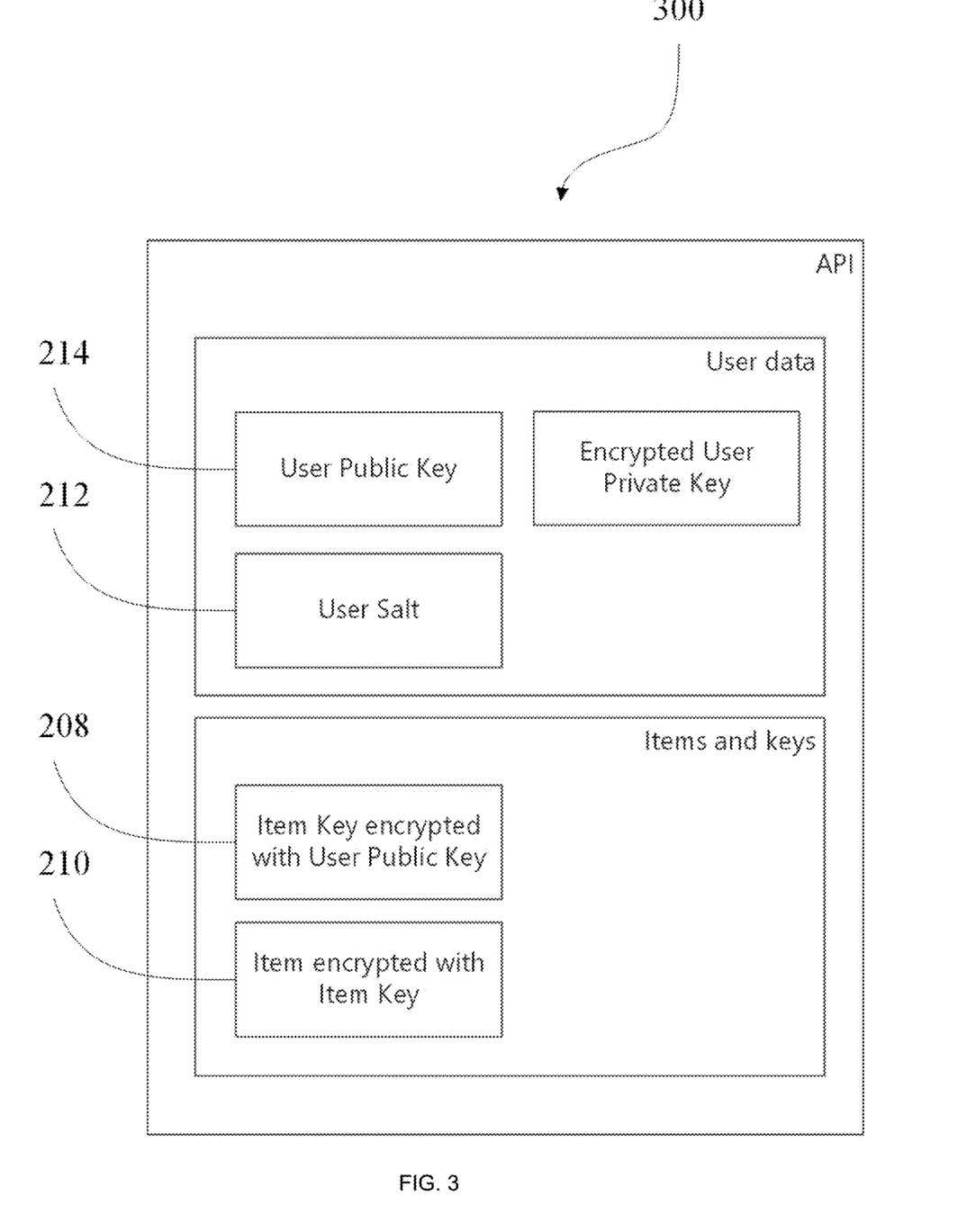
FIG. 3 is a component diagram of API

Both items and their corresponding Item Keys 208, as well as the user's Public Key 214, are stored online within the API 300. FIG. 3 shows the various keys, as well as other data, stored inside the API. The Item Keys 208 are each encrypted with the user's Public Key 214 before placing them within API database. User's corresponding Private key is used to decrypt the symmetric keys. The Private key is placed within the User device 200, unencrypted when necessary, otherwise always encrypted with the user's symmetric Master key 204 and is never stored unencrypted anywhere else except for the User device 200. In the current embodiment, encryption/decryption operations are transparent i.e. are performed by the Application 202 when requested by the user through GUI. So, the option of selecting a specific key, substituting keys is concealed from the user. However, the options of encryption/decryption operations, e.g. the selection of encryption keys, may be visible to the user, i.e. this technical specification should not limit the scope of the embodiment.

The computer executable program comprises code segments for enabling a user to share an encrypted item with another user, verifying the receiving user along the way and possibly allowing the Sender to verify the Receiver.

A code segment within Application 202 enables a user initiating the sharing, Sender further on in the document, to provide input for deriving the symmetric Master key 204 when prompted by the Application 202 while launching said application, e.g. the Application 202 prompts a user to provide the Master password. When derived, the Master key 204 allows Sender to decrypt and access Sender's Private key thus getting full access to all the Item Keys. Sender further obtains the item identification and Item Key from API 300 and locally decrypts the Item Key 208 with Sender's Private key 206. Thus, during the initial steps of the Sharing flow the Sender obtains the item identification of the item it wishes to share, as well as all the encryption keys necessary to gain access to the item and to authenticate the Sender as the user initiating the Sharing sequence.

To proceed with the item Sharing, Sender may request an identification of the Receiver from API by providing Receiver's email address. Receiver's identification may be provided in the format of Receiver's Public Key 214, of the Receiver's asymmetric key pair. The Sender's application may store and use the Receiver's Public Key 214 locally in order to perform verification operation according to the flow described below.

Sender further encrypts the Item Key 208, of the item that is to be shared, with Receiver's Public Key 214, and stores the result within API 300, together with the item's identification.

In case the Receiver's Public Key 214 is not accessible to the Sender, the Sender records the information about the pending share in API 300, signing this information with Sender's Private Key 206. The information includes Sender's identification, Item Identification, Receiver's email and Sender's digital signature.

Another code segment within Application 202 enables Receiver to verify the Sender, i.e. to ensure that the initiator of sharing an item is indeed the person declared, as opposed to any party that might try to impersonate the legitimate sender most of all—to prevent the service provider from substituting the Public Key 214 that are necessary for sharing flow with its own set of public keys, therefore obtaining access to the data shared and avoiding detection by the end users—Sender and Receiver. To achieve this Sender obtains Receiver's Public Key 214 provided by API for the specified email. Other means to identify the Receiver may be first name and second name coupled with an enterprise identification, social networks' or instant messaging platforms' identity. Using Receiver's Public Key 214 and Sender's Private Key Sender encrypts a random message in application and shares encrypted value with Receiver via out-of-band channel. Henceforth Receiver decrypts (using Receiver's Private Key and Sender's Public Key 214) the encrypted value and communicates the value via out-of-band channel to Sender. Consequently, trust is established with Receiver signing Sender's Public Key 214 and storing the result in API database, correspondingly making it possible to access the signed Sender's Public Key 214 from any number of devices Receiver might use.

Receiver signs Sender's Public Key 214 with Receiver's Private Key. This digital signature can be verified by anybody who has access to the Receiver's Public Key 214, i.e. virtually anybody. This verification proves that the person signing Sender's Public Key 214 has access to Receiver's Private Key and is indeed Receiver himself. This also ensures that the key signed in this fashion has not been tampered with or changed in any way, as the signature is mathematically bound to the key originally signed with it, and verification will fail for practically any other key, no matter how similar to the original key.

To establish trust in the opposite direction Sender signs Receiver's Public Key 214 obtained during the Sharing flow and storing the signed key in API database which makes it possible to access the signed Receiver's Public Key 214 from any number of devices Sender might use.

According to an embodiment, the Application 202 enables a user to selectively assign encrypted objects access rights, partially or in full, to a user of their choosing.

In another embodiment, the use of multi-factor authentication between the user and API enables additional security and authentication features such as step-up authentication on a per application basis, or secure Single sign-on in a shared device environment. Single sign-on (SSO) is a property of access control of multiple related, yet independent, software systems. With this property, a user logs in with a single ID and password to gain access to any of several related systems.

Some aspects described herein may provide mutual user verification is provided in the absence of a trusted authority platform. Some embodiments may provide the ability to maintain a certificate, or other types of security tokens, as a shared encrypted item coupled with an external enrollment mechanism. With the certificates securely stored in this fashion, applications may access the certificate/virtual smart card once the user provides his input for deriving the Master Key 204 and the Application 202 registers with the Application 202 backend.

Some aspects described herein may provide a step-up authentication on a per-application basis. A private customer or enterprise resources may require a higher assurance authentication. In some embodiments, the Application 202 may retrieve the higher assurance authorization and store the credentials for the particular resource in an encrypted form that also allows for sharing said set of credentials in a secure manner. As a result, step-up authentication may be provided on a per-application basis while maintaining single sign on features as to other resources.

Some aspects described herein may provide support for multiple users on a shared device. The device may maintain more than one user context for the encryption protection application. When a user switch is detected, such as when one user logs off or another user enters their passcode, the device may seamlessly switch contexts to reflect information and credentials associated with the new user.

These and other important aspects of the present invention are described more fully in the detailed description below.

DETAILED DESCRIPTION

Some general terminology definitions as well as descriptions of invention components and participants may be helpful and are included herein for convenience and are intended to be interpreted in the broadest possible interpretation:

Application 202—a computer program, a computer code, a set of instructions executed within the User device with the particular purpose of protecting digital objects and items with encryption, sharing the protected objects and items with other users of the same application, as well as verifying other users of the same application.

User device 200—a computing device where a person installs and executes the application. The person can be a Sender or a Receiver, or both.

Sender—a role that a computer user assumes when initiating a Sharing of an encrypted item with another computer user.

Receiver—a role that a computer user is assigned when an encrypted item has been shared with the said user, for example from the Sender.

API (300)—the designated name of the sum of programmatic endpoints for communication between the service provider and Application 202 users. Service provider can be any legal entity, that owns and is responsible for the functioning of API. In the context of the described embodiments service provider can be represented by a Service Provider Server (SPS), a computing device that has the programmatic code of API 300 deployed and executed within. The provider participates in sharing and verification workflows as an assisting mediator and is not intended to have access to the decrypted items or the cryptographic keys necessary to decrypt said items. API also contains data comprised of user attributes, encrypted items and corresponding Item encryption Keys, stored in API in an encrypted form.

Out-of-band channel, or OOB—the exchange of messages or data between Sender and Receiver that circumvents API, be it a direct contact, a phone call, email communication, SMS communication, communication by any chat application or any other channel that is not related to the API.

Master Key 204—a symmetric encryption key, which is unique for each user of the solution, and is derived from a Master password known only to a user. Additionally, the Master Key 204 includes additional entropy, e.g. Salt 212, which is unique to each user, provided by the service provider. The Master Key 204 is used to encrypt a Private Key 206 of an asymmetric key pair of the user.

Public Key 214—the public part of an asymmetric key pair belonging to the user. This key is publicly accessible to everyone, e.g. another user of the Application 202. This key is used to encrypt data so that only the owner of the corresponding private key can decrypt the data. The secondary function of the Public Key 214 is to verify cryptographic signatures produced with the corresponding private key. According to some embodiments, the Public Key 214 is also employed to encrypt Item Keys 208 to protect the Item Keys 208 from being accessed by anyone except the legitimate owner of the corresponding asymmetric key pair.

Private Key 206—the private part of the asymmetric key pair belonging to the user. This key is kept secret and is not supposed to be accessible to an entity other than the owning user. The primary function of the key is to decrypt the data encrypted with the corresponding Public Key 214. The secondary function is to cryptographically sign a piece of data, for example a particular item belonging to a user. The signature can be verified by anyone who can access the corresponding Public Key 214. According to some embodiments, the Private Key 206 is used to decrypt item keys before they can be used to access protected items.

Item—any object stored in API, accessed through the Application 202, protected by encrypting an object or item with an individual symmetric Item Key 208.

Item Key 208—a symmetric key, created for individually encrypting a single protected item. This key is encrypted by the user's Public Key 214 and can only be decrypted with the user's Private Key 206. Verification message—an arbitrary string of characters, numbers and symbols, that when encrypted by Sender and communicated to Receiver, is a prerequisite for user verification.

The current embodiments disclose a computer implemented method for establishing a two-way trust between users of the Application 202. The disclosed method comprises: obtaining, at a Sender's device, a receiver's Public Key 214 provided by API; encrypting, at the Sender's device, a verification message with the Receiver's Public Key 214 and the Sender's Private Key 206; sending the encrypted verification message from the Sender's device to the Receiver's device through the out-of-band channel; decrypting, at the Receiver's device, the encrypted verification message using Receiver's Private Key 206 and Sender's Public Key 214; communicating, from the Receiver to the Sender, decrypted verification message via out-of-band channel 602; confirming by the Sender that the decrypted verification message, communicated by the Receiver, is identical to the verification message encrypted by the Sender; establishing, by the Receiver, a one-way trust by signing the Sender's Public Key 214 at the Receiver's device, with the Receiver's Private Key 206; signing, at the Sender's device, the Receiver's Public Key 214 with the Sender's Private Key 206, to establish a two-way trust.

In the verification method, the signed Sender's Public Key 214 is stored in at least one of the following: the API, the Receiver's device, or a database, accessible from the Application 202 user's device. The API is provided by a service provider server, serving as a communication mediator between the Sender's device and the Receiver's device during verification flow.

During the verification flow, the out-of-band channel 602 is used. It can be at least one of the following: a direct conversation, phone call, email communication, SMS, communication by an Internet chat application, or any other communication channel that does not rely upon the API. The asymmetrical encryption method is used.

The disclosed method also describes the sharing of an encrypted item with another user of the Application 202. The sharing contains the following steps: requesting, from the sender to the API, receiver's Public Key 214 by providing at least one of an email ID or other identifying information of the receiver to the API; receiving, at the sender device, Receiver's Public Key 214 from the API; encrypting an Item Key 208 with Receiver's Public Key 214, the individual Item Key 208 corresponding to an Item 210 to be sent from the Sender's device to the Receiver's device; sending, from the Sender's device, the encrypted Item Key 208 to the API with an Item 210 identification; obtaining, at the receiver device, the encrypted Item Key 208 from the API; decrypting the Item Key 208 with Receiver's Private Key 206; decrypting the Item 210 using the decrypted Item Key 208; informing the Sender, by the API, about the access occurring, marking the share as successful within the API.

The method for sharing encrypted items, further comprising the steps of assigning a unique item identification to the Item 210 that is shared; and encrypting the Item 210 using an individual symmetric Item Key 208.

In case the Receiver's Public Key 214 is not accessible to the Sender, the Sender records the information about the attempted share in API 300, signing this information with Sender's Private Key 206. The information includes Sender's identification, Item Identification, Receiver's email and Sender's digital signature. In such a scenario, Receiver generates an asymmetric key pair at the Receiver's device and makes the Receiver's Public Key 214 available to the Sender for download of the Receiver's Public Key 214 from API 300.

The embodiments also discloses an apparatus for establishing a trust relationship between users. The apparatus comprises: a sender device containing the Application; a receiver device containing the Application; a service provider server (SPS) containing the application programming interface (API); a network communicably coupling the sender device, the receiver device and the SPS; and an out-of-band (OOB) channel, separate from the network, communicably coupling the sender device and the receiver device, wherein the apparatus performs a method of: obtaining, at a Sender's device, a receiver's Public Key provided by an Application Programming Interface (API), encrypting, at the Sender's device, a verification message with the Receiver's Public key and the Sender's Private Key, sending the encrypted verification message from the Sender's device to the Receiver's device through the out-of-band channel, decrypting, at the Receiver's device, the encrypted verification message using Receiver's Private Key and Sender's Public Key, communicating, from the Receiver to the Sender, decrypted verification message via out-of-band channel, confirming by the Sender that the decrypted verification message, communicated by the Receiver, is identical to the verification message encrypted by the Sender, establishing, by the Receiver, a one-way trust by signing the Sender's Public Key at the Receiver's device, with the Receiver's Private Key.

In the disclosed apparatus the signed Sender's Public Key is stored in at least one of the following: the API, the Receiver's device, or a database, accessible from the Application user's device. The API is provided by a service provider server, serving as a communication mediator between the Sender's device and the Receiver's device during verification flow.

In the disclosed method and apparatus, the Application can be a stand-alone application installed locally within the user's device or remotely, an application's plug-in, an application executed locally or remotely, or an application made available to the user in any other form.

Figure 1:
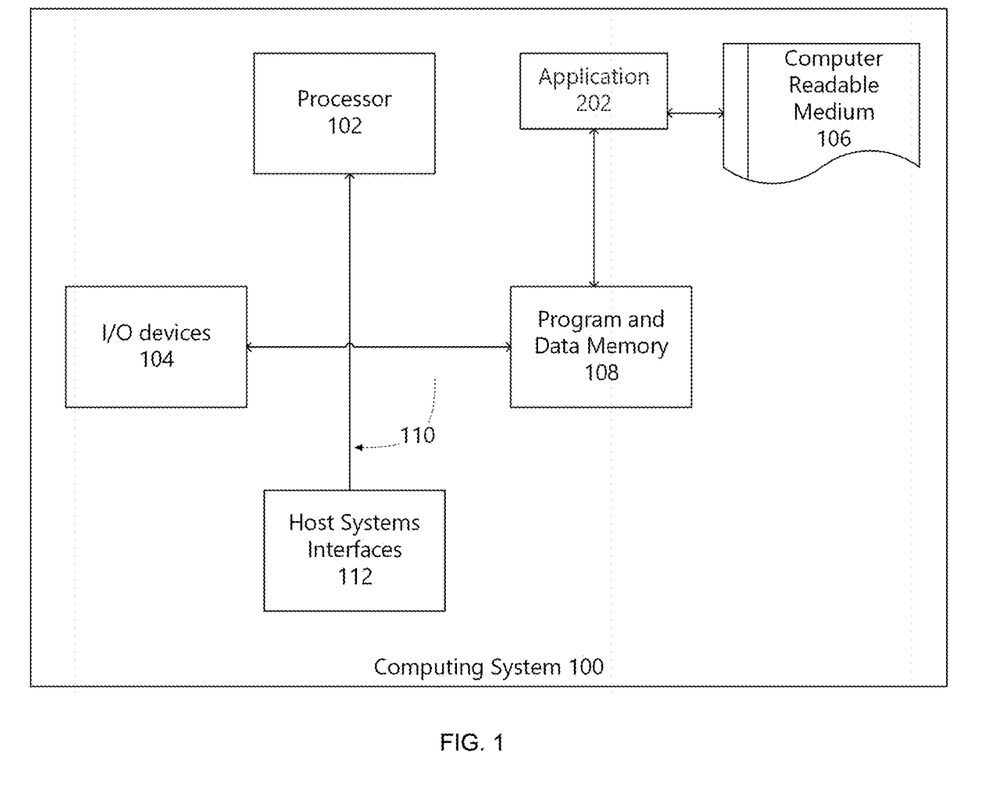
FIG. 1 is a component diagram of a computing system that may be the participant of an encryption protection application setup.

The embodiments herein may be combined in a variety of ways as a matter of design choice. Accordingly, the features and aspects herein are not intended to be limited to any particular embodiment. Furthermore, the embodiments can take the form of hardware, firmware, software, and/or combinations thereof. In one embodiment, such software includes but is not limited to firmware, resident software, microcode, etc. FIG. 1 illustrates a computing system 100 in which a Computer Readable Medium 106 may provide instructions for performing any of the methods and processes disclosed herein.

Furthermore, some aspects of the embodiments herein can take the form of a computer program product accessible from the Computer Readable Medium 106 to provide program code for use by or in connection with a computer or any instruction execution system. For the purposes of this description, the Computer Readable Medium 106 can be any apparatus that can tangibly store the program code for use by or in connection with the instruction execution system, apparatus, or device, including the Computing System 100.

The Computer Readable Medium 106 can be any tangible electronic, magnetic, optical, electromagnetic, infrared, or semiconductor system (or apparatus or device). Some examples of a Computer Readable Medium 106 include solid state memories, magnetic tapes, removable computer diskettes, random access memories (RAM), read-only memories (ROM), magnetic disks, and optical disks. Some examples of optical disks include read only compact disks (CD-ROM), read/write compact disks (CD-R/W), and digital versatile disks (DVD).

The Computing System 100 can include one or more processors 102 coupled directly or indirectly to Program and Data Memory 108 through a system bus 110. The Program and Data Memory 108 can include local memory employed during actual execution of the Application 202, bulk storage, and/or cache memories, which provide temporary storage of at least some of the program code in order to reduce the number of times the code is retrieved from bulk storage during execution.

Input/output (I/O) devices 104 (including but not limited to keyboards, displays, pointing devices, I/O interfaces, etc.) can be coupled to the Computing System 100 either directly or through intervening I/O controllers. Network adapters may also be coupled to the Computing System 100 to enable the Computing System 100 to couple to other data processing systems, such as through Host Systems Interfaces 112, printers, and/or or storage devices through intervening private or public networks. Modems, cable modems, and Ethernet cards are just examples of network adapter types.

FIG. 1 is a component diagram of a Computing System 100 that shows an overall hardware architecture of a computer system that is running the Application 202. The Computing System 100 combines I/O devices 104, Processor 102, Computer Readable Medium 106, Program and Data Memory 108, Host Systems Interfaces 112. The Computing System 100 is a User device 200.

Figure 2:
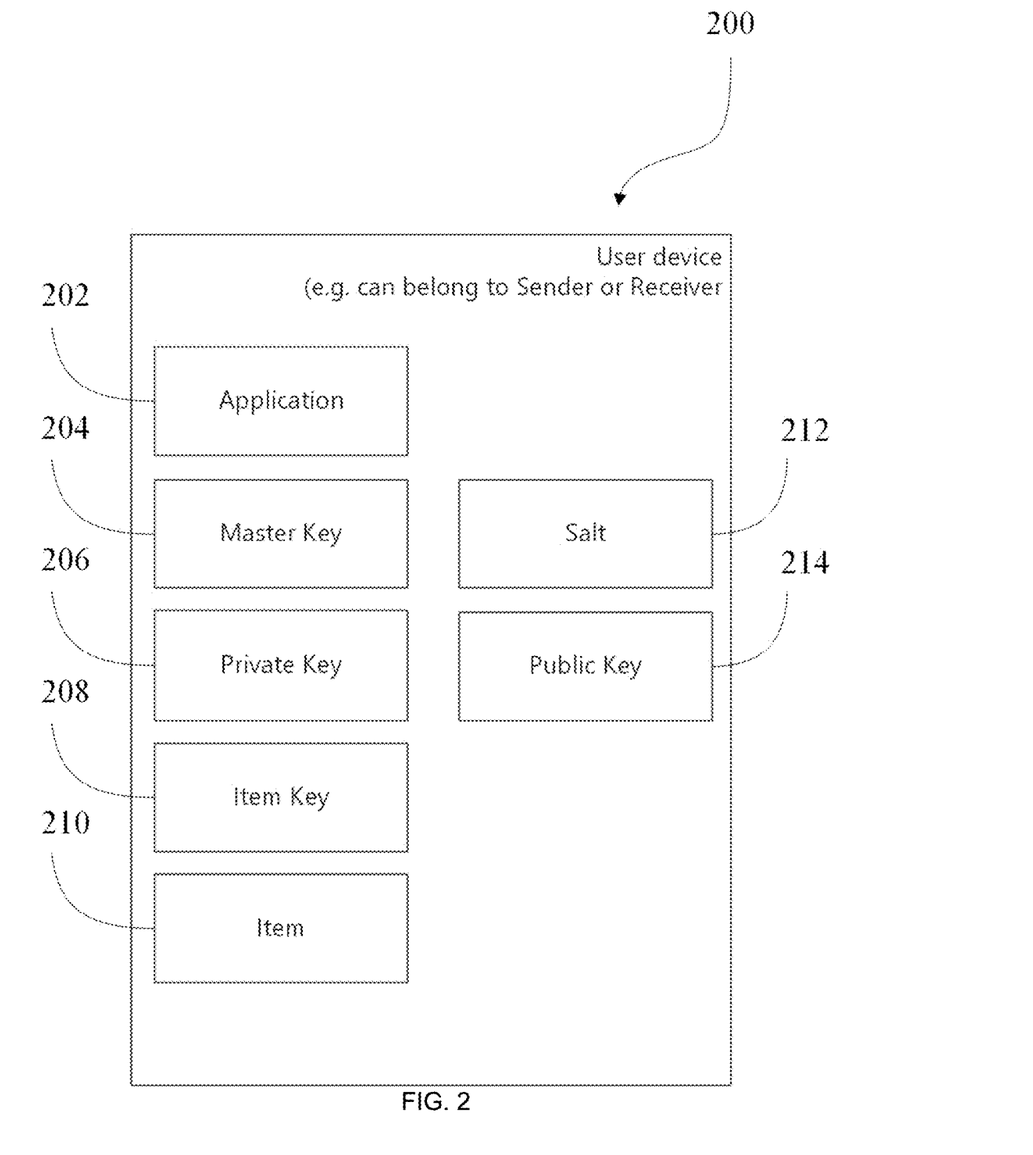
FIG. 2 is a component diagram of an Application user device.

FIG. 2 is a component diagram of elements that are contained within User device 200. The User device 200 contains at least the following: computer Application 202, Master Key 204, Private Key 206, Item Key 208, Item 210, Salt 212, Public Key 214.

FIG. 3 is a component diagram of the API 300. API 300 contains Users data, such as: User Public Key 214 and User Salt 212. API also contains Protected items and keys: Item Key 208 encrypted with User Public Key 214 and encrypted Item 210. Items and keys contained therein are the encrypted versions of objects in User device 200, or objects publicly available.

Figure 4:
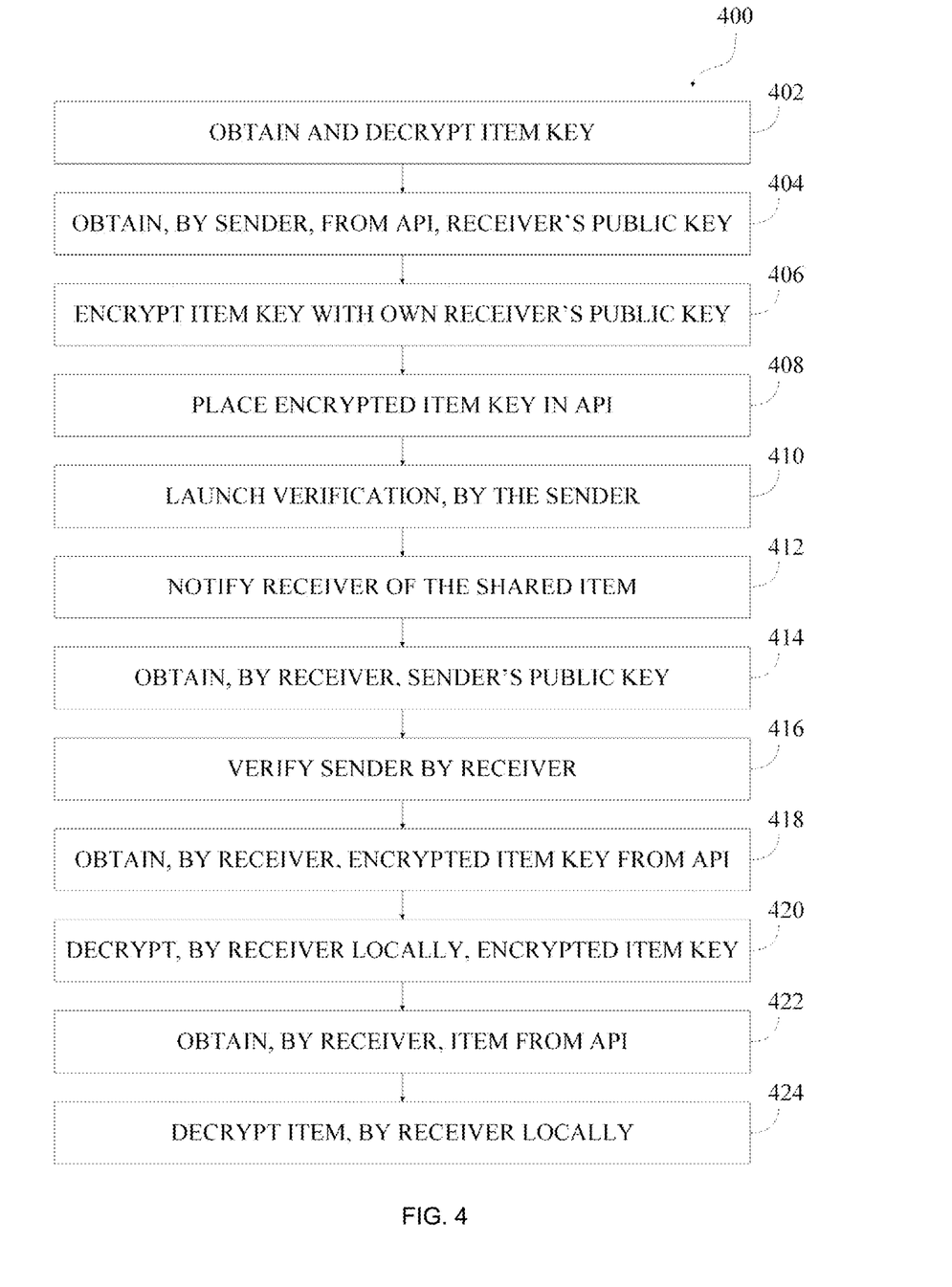
FIG. 4 is a depiction of encrypted item sharing method 400.

FIG. 4 is a sequence diagram of a method 400 for sharing an Item encrypted 308, according to embodiments of the present invention. At step 402, sender opens an Item 210 locally and decrypts the Item 210. At step 404, the sender obtains Receiver's Public Key from API at service provider. Next, as step 406, the sender encrypts Item Key 208 with Receiver's Public Key. Next, at step 408, the Sender stores encrypted Item Key 208 and the corresponding Item 210 in API, step 408. The Sender launches the verification, step 410 and notifies Receiver of the shared Item 210, step 412. Receiver obtains Sender's Public Key, step 414 and verifies the Sender, step 416. By the next step, the Receiver obtains encrypted Item Key from API, step 418. The Receiver decrypts encrypted Item Key locally 420 and obtains Item 210 from API, step 422. Receiver decrypts Item 210 locally, step 424.

Figure 5:
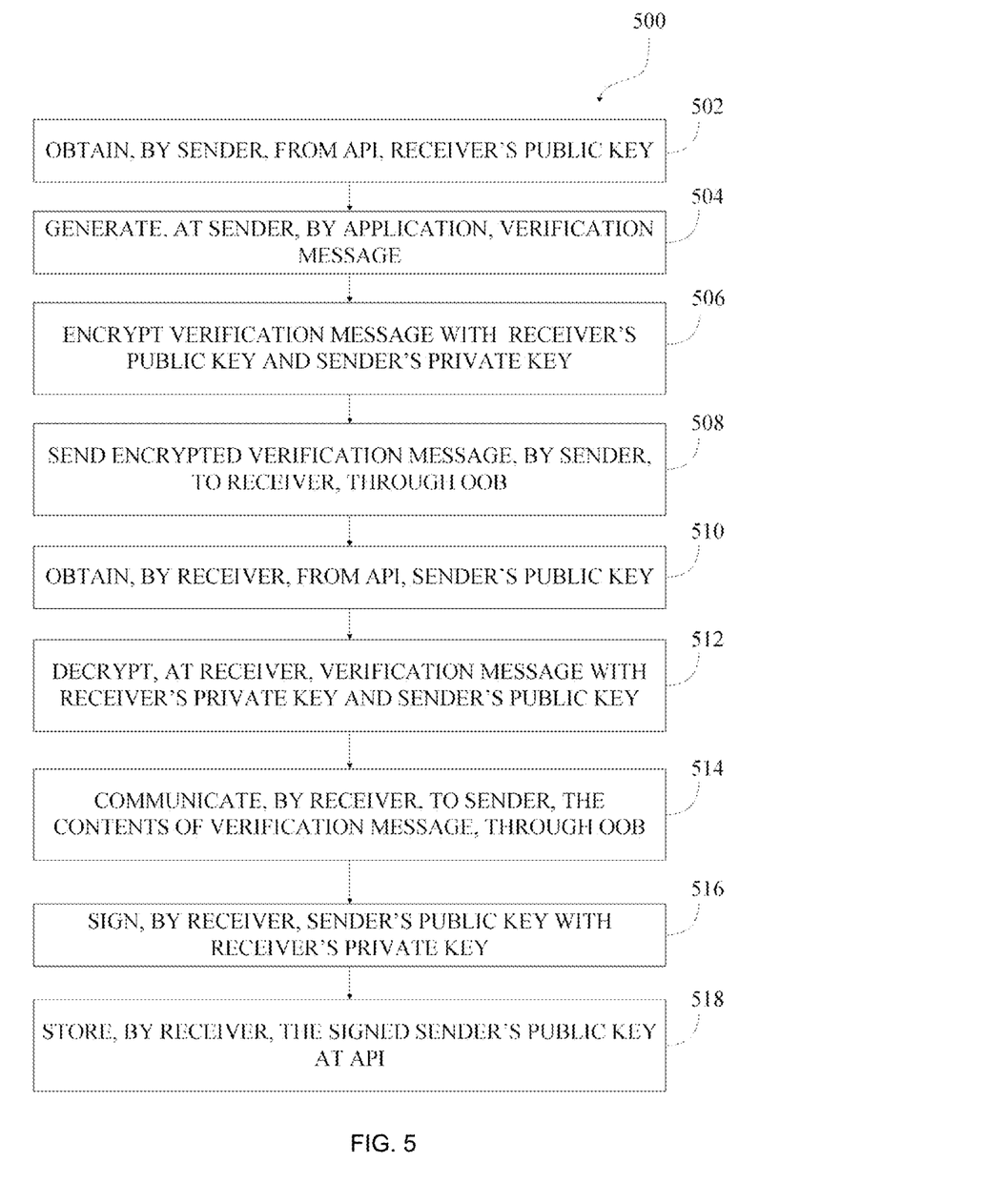
FIG. 5 is to support application user verification method 500.

FIG. 5 depicting a method 500 for user verification, as implemented by the Application 202 of FIG. 2. The diagram discloses the steps of Receiver verifying the Sender. Sender obtains from API Receiver's Public Key, step 502, then Sender generates verification message, step 504. Verification message is encrypted with Receiver's Public Key and Sender's Private Key, step 506. Sender sends an encrypted verification message to Receiver through OOB (Out-of-band channel), step 508. Receiver obtains Sender's Public Key from API, step 510. Receiver decrypts the verification message with Receiver's Private Key and Sender's Public Key, step 512. After this step, Receiver communicates the decrypted verification message to Sender through OOB, step 514. If the verification messages coincide, Receiver signs Sender's Public Key with Receiver's Private Key, step 516 and Receiver stores signed Sender's Public Key at API, step 518.

Figure 6:
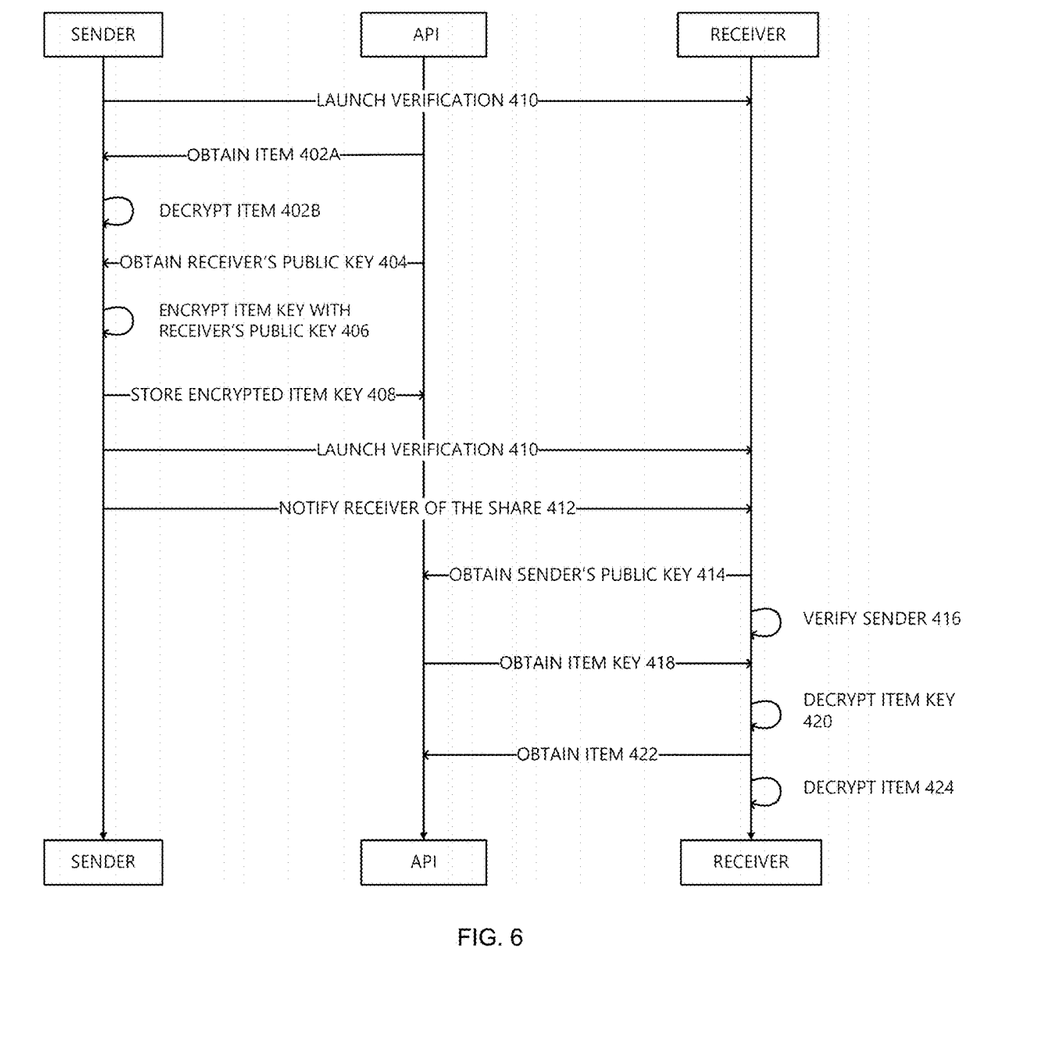
FIG. 6 is a demonstration of an exemplary method involving the present embodiments. As shown in the diagram, the method 400 involves a customer of the encryption protection application sharing an encrypted item with another customer of said application.

FIG. 6 adds additional clarity regarding the initiators of particular steps and the direction of communication. FIG. 6 shows a method for sharing an Item encrypted with Item Key 308, according to an embodiment of the present invention. At step 402, Sender opens an Item 210 locally and decrypts the Item 210. At step 404, the sender obtains Receiver's Public Key from API at service provider. Next, as step 406, the sender encrypts Item Key 208 with Receiver's Public Key. Next, at step 408, the Sender stores encrypted Item Key 208 and the corresponding Item 210 in API, step 408. The Sender launches the verification, step 410 and notifies Receiver of the shared Item 210, step 412. Receiver obtains Sender's Public Key, step 414 and verifies the Sender, step 416. By the next step, the Receiver obtains encrypted Item Key from API, step 418. The Receiver decrypts encrypted Item Key locally 420 and obtains Item 210 from API, step 422. Receiver decrypts Item 210 locally, step 424. For the person skilled in the art it should be clear that the verification flow mentioned in this description can be initiated by any participant of the sharing flow, since in the end of the verification flow both users have sufficient information to trust their counterpart. Therefore, the trust established based on the verification can be one-way in any direction or two-way. Also it should be noted that verification is not rigidly attached to a particular place in the sharing flow, therefore it can be launched either by the Sender before sharing a protected item with another user of the Application, or by the Receiver on getting notification about an Item being shared with Receiver.

Figure 7:
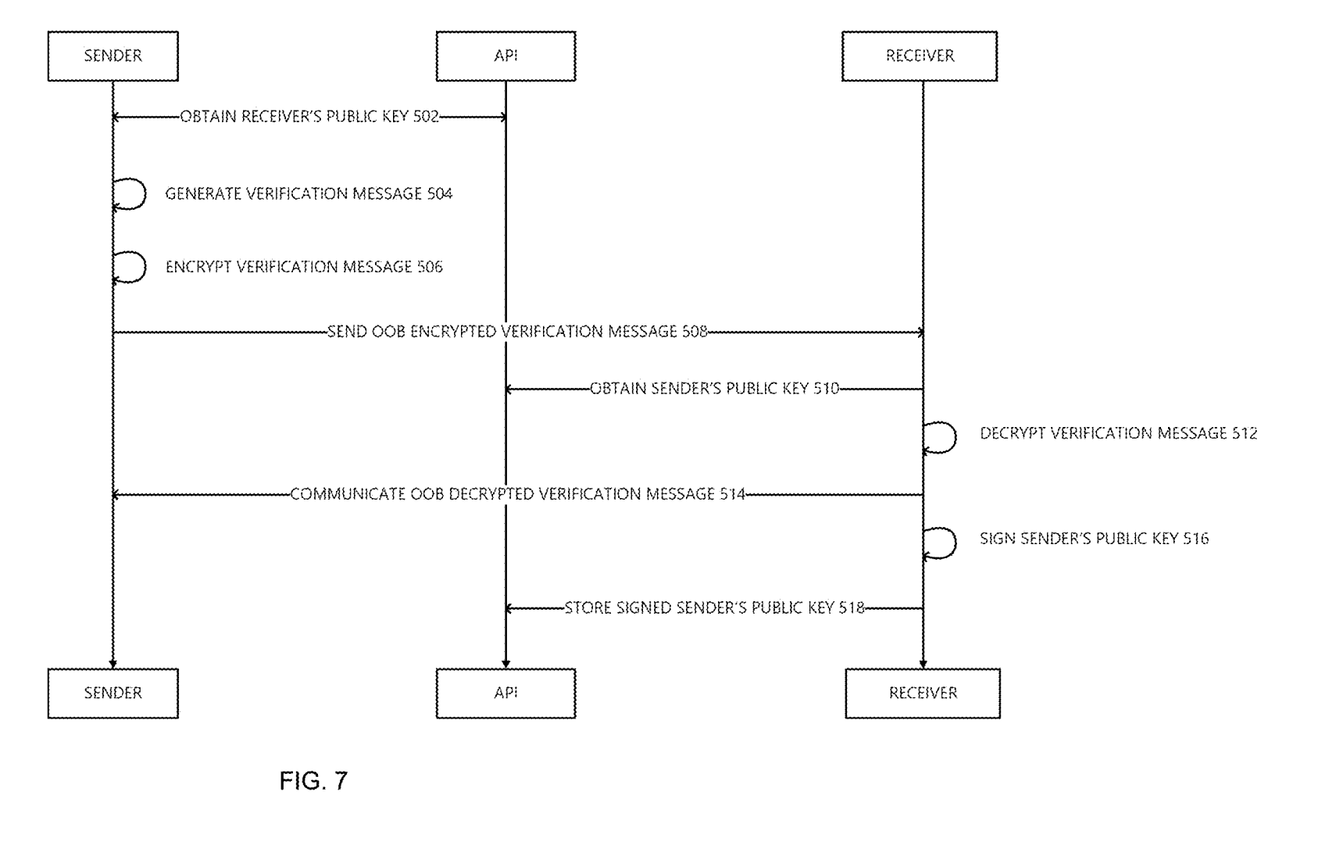
FIG. 7 is a display of a method comprising the present embodiments. Demonstrated in the diagram is the method 500 that involves a customer of the encryption protection application initiating a verification flow in order to validate another customer of said encryption protection application.
Figure 8:
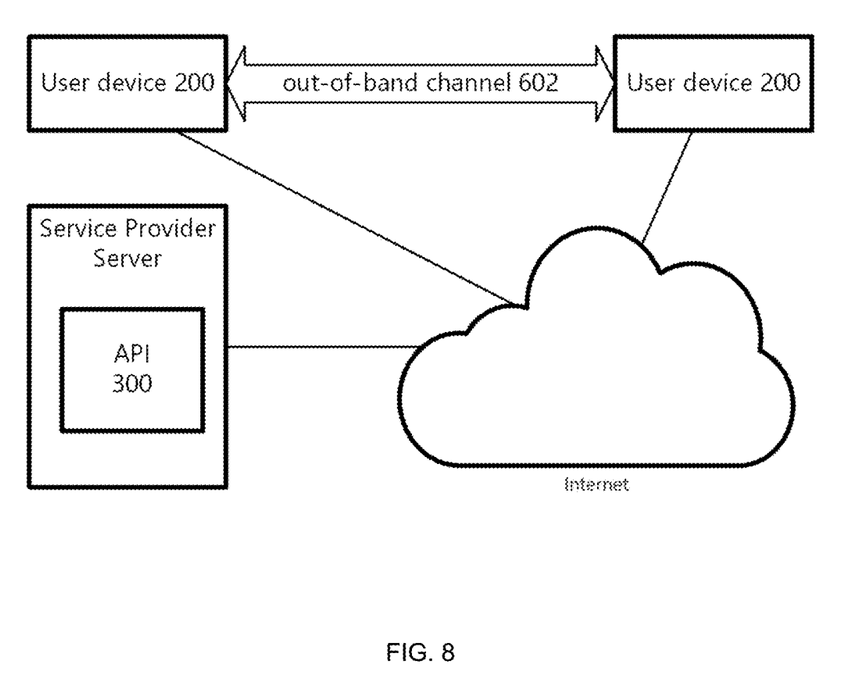
FIG. 8 is an architectural layout of an apparatus for sharing encrypted items with participants verification.

FIG. 7 adds additional clarity regarding the initiators of particular steps and the direction of communication. FIG. 7 depicts a method 500 for user verification, as implemented by the Application 202 of FIG. 2. The diagram discloses the steps of Receiver verifying the Sender. Sender obtains from API Receiver's Public Key, step 502, then Sender generates verification message, step 504. Verification message is encrypted with Receiver's Public Key and Sender's Private Key, step 506. Sender sends an encrypted verification message to Receiver through OOB (Out-of-band channel), step 508. Receiver obtains Sender's Public Key from API, step 510. Receiver decrypts the verification message with Receiver's Private Key and Sender's Public Key, step 512. After this step, Receiver communicates the decrypted verification message to Sender through OOB, step 514. If the verification messages coincide, Receiver signs Sender's Public Key with Receiver's Private Key, step 516 and Receiver stores signed Sender's Public Key at API, step 518. For the person skilled in the art it should be clear that in the current embodiment the verification flow can be initiated by any participant of the sharing flow, since in the end of the verification flow both users have sufficient information to trust their counterpart. Therefore, the trust established based on the verification can be one-way in any direction or two-way. Also it should be noted that verification is not rigidly attached to a particular place in the sharing flow, therefore it can be launched either by the Sender before sharing a protected item with another user of the Application, or by the Receiver on getting notification about an Item being shared with Receiver.

In one aspect, the present embodiments include a system and a method for effectively sharing encrypted data (such as passwords, access to digital items). Those of ordinary skill in the art will realize that the following detailed description of the present embodiments is illustrative only and is not intended to be in any way limiting. Other embodiments of the present system(s) and method(s) will readily suggest themselves to such skilled persons having the benefit of this disclosure. Reference will now be made in detail to implementations of the present embodiments as illustrated in the accompanying drawings. The same reference indicators will be used throughout the drawings and the following detailed description to refer to the same or like parts.

Although several embodiments have been described, one of ordinary skill in the art will appreciate that various modifications and changes can be made without departing from the scope of the embodiments detailed herein. Accordingly, the specification and figures are to be regarded in an illustrative rather than a restrictive sense, and all such modifications are intended to be included within the scope of the present teachings.

Moreover, in this document, relational terms such as first and second, and the like may be used solely to distinguish one entity or action from another entity or action without necessarily requiring or implying any actual such relationship or order between such entities or actions. The terms "comprises", "comprising", "has", "having", "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. The term "coupled" as used herein is defined as connected, although not necessarily directly and not necessarily mechanically. A device or structure that is "configured" in a certain way is configured in at least that way, but may also be configured in ways that are not listed.

What is claimed:

1. A computer implemented method for establishing a trust relationship between users of an Application, the users comprising a sender and a receiver, the sender using at least one sender device comprising a first sender device and the receiver using at least one receiver device comprising a first receiver device, the method comprising:
   obtaining, at the first sender device, a receiver's Public Key provided by an application programming interface (API) comprised in a service provider server (SPS);
   encrypting, at the first sender device, a verification message with the receiver's Public key and a sender's Private Key, wherein the first sender device, the first receiver device and the SPS are communicably coupled via a network;
   sending the encrypted verification message from the first sender device to the first receiver device through an out-of-band (OOB) channel, wherein the OOB channel circumvents the network;
   decrypting, at the first receiver device, the encrypted verification message using a receiver's Private Key and a sender's Public Key,
   wherein each of the sender's public key, the sender's private key, the receiver's public key, and the receiver's private key, is a user-associated and device-independent key;
   communicating, from the receiver to the sender, the decrypted verification message via the OOB channel;
   confirming by the sender that the decrypted verification message, communicated by the receiver, is identical to the verification message encrypted by the sender; and
   initiating, by the receiver, a two-way trust by signing the sender's Public Key at the receiver's device, with the receiver's Private Key.

2. The method according to claim 1, further comprising:
   initiating, by the sender, sharing of an encrypted item with the receiver, over the network via the SPS, wherein the initiating the sharing of the encrypted item comprises:
      requesting, from the sender to the API, the receiver's public key by providing at least one of an email ID or other identifying information of the receiver to the API,
      receiving, at the first sender device, the receiver's Public Key from the API,
      encrypting an individual Item Key with the receiver's Public Key, wherein the encrypted item is encrypted using the individual item key,
      sending, from the first sender device, the encrypted Item Key to the API with an item identification,
      obtaining, at the first receiver device, the encrypted Item Key from the API,
      decrypting the Item Key with the receiver's Private Key, and
      decrypting the Item using the decrypted Item Key.

3. The method according to claim 2, further comprising:
   assigning a unique item identification to the item that is shared; and
   encrypting the item using an individual symmetric item key.

4. The method according to claim 2, wherein when the receiver's Public Key is not accessible to the sender, the sender records the information about a pending share in API, and signs the information with the sender's Private Key.

5. The method according to claim 4, further comprising
   accepting the pending share by the receiver;
   generating an asymmetric key pair at the first receiver device; and
   making the receiver's Public Key available to the sender by storing the receiver's Public Key at API.

6. The method according to claim 1, wherein the signed sender's Public Key is stored in at least one of the following:

the API, the first receiver device, or a database accessible from the Application users' devices.

7. The method according to claim 1, wherein the OOB channel is at least one of a direct conversation, phone call, email communication, SMS, communication by an Internet chat application, or a communication channel that circumvents the API.

8. The method according to claim 1, wherein the Application is a stand-alone application installed locally within the users' devices or remotely, an application's plug-in, an application executed locally or remotely, or an application made available to the users in any other form.

9. The method of claim 1, further comprising finalizing, by the sender, the two-way trust by signing the receiver's Public Key at the first sender device, with the sender's Private Key.

10. An apparatus for establishing a trust relationship between users of an Application, the users comprising a sender and a receiver, the sender using at least one sender device comprising a first sender device and the receiver using at least one receiver device comprising a first receiver device, the apparatus comprising:
   the first sender device containing the Application;
   the first receiver device containing the Application;
   a service provider server (SPS) containing an application programming interface (API);
   a network communicably coupling the first sender device, the first receiver device and the SPS; and
   an out-of-band (OOB) channel communicably coupling the first sender device and the first receiver device, the OOB channel circumventing the network,
   wherein the apparatus performs a method comprising:
      obtaining, at the first sender device, a receiver's Public Key provided by the Application Programming Interface (API),
      encrypting, at the first sender device, a verification message with the receiver's Public key and a sender's Private Key,
      sending the encrypted verification message from the first sender device to the first receiver device through the out of band OOB channel,
      decrypting, at the first receiver device, the encrypted verification message using a receiver's Private Key and a sender's Public Key, wherein each of the sender's public key, the sender's private key, the receiver's public key, and the receiver's private key, is a user-associated and device-independent key,
      communicating, from the receiver to the sender, the decrypted verification message via the OOB channel,
      confirming by the sender that the decrypted verification message, communicated by the receiver, is identical to the verification message encrypted by the sender,
      initiating, by the receiver, a two-way trust by signing the sender's Public Key at the receiver's device, with the receiver's Private Key.

11. The apparatus according to claim 10, wherein the method further comprises:
      initiating, by the sender, sharing of an encrypted item with the receiver, over the network via the SPS, wherein the initiating the sharing of the encrypted item comprises:
      requesting, from the sender to the API, the receiver's Public Key by providing, to the API, at least one of an email ID or other identifying information of the receiver,
      receiving, at the first sender device, the receiver's Public Key from the API,
      encrypting, at the first sender device, an individual Item Key with receiver's Public Key, the individual Item Key corresponding to an item to be shared,
      sending, from the first sender device, the encrypted Item Key to the API with an item identification,
      obtaining, at the first receiver device, the encrypted Item Key from the API,
      decrypting the Item Key with the receiver's Private Key, and
      decrypting the Item using the decrypted Item Key.

12. The apparatus according to claim 11, further comprising:
      assigning a unique item identification to the item that is shared; and
      encrypting the item using an individual symmetric item key.

13. The apparatus according to claim 11, wherein the sender determines that the receiver's Public Key is not accessible to the sender, and consequently records information regarding the sharing of the encrypted item in the API, and wherein the sender signs the information with the sender's Private Key.

14. The apparatus according to claim 13, wherein the method further comprises:
      accepting, by the receiver, the information;
      generating an asymmetric key pair at the first receiver device; and
      making the receiver's Public Key available to the sender by storing the receiver's Public Key at the API.

15. The apparatus according to claim 11, wherein the Application is a stand-alone application installed locally within the users' devices or remotely, an application's plug-in, an application executed locally or remotely, or an application made available to the users in any other form.

16. The apparatus according to claim 10, wherein the signed sender's Public Key is stored in at least one of the following: the API, the first receiver device, or a database, accessible from the Application users' devices.

17. The apparatus according to claim 10, wherein the OOB channel is at least one of a direct conversation, phone call, email communication, SMS, communication by an Internet chat application, or a communication channel that circumvents the API.

18. The apparatus of claim 10, wherein the method further comprises finalizing, by the sender, the two-way trust by signing the receiver's Public Key at the first sender device, with the sender's Private Key.

* * * * *